T. G. LEAVELL.
THRESHING CYLINDER.
APPLICATION FILED SEPT. 30, 1912.
Reissued July 22, 1913.
13,599.
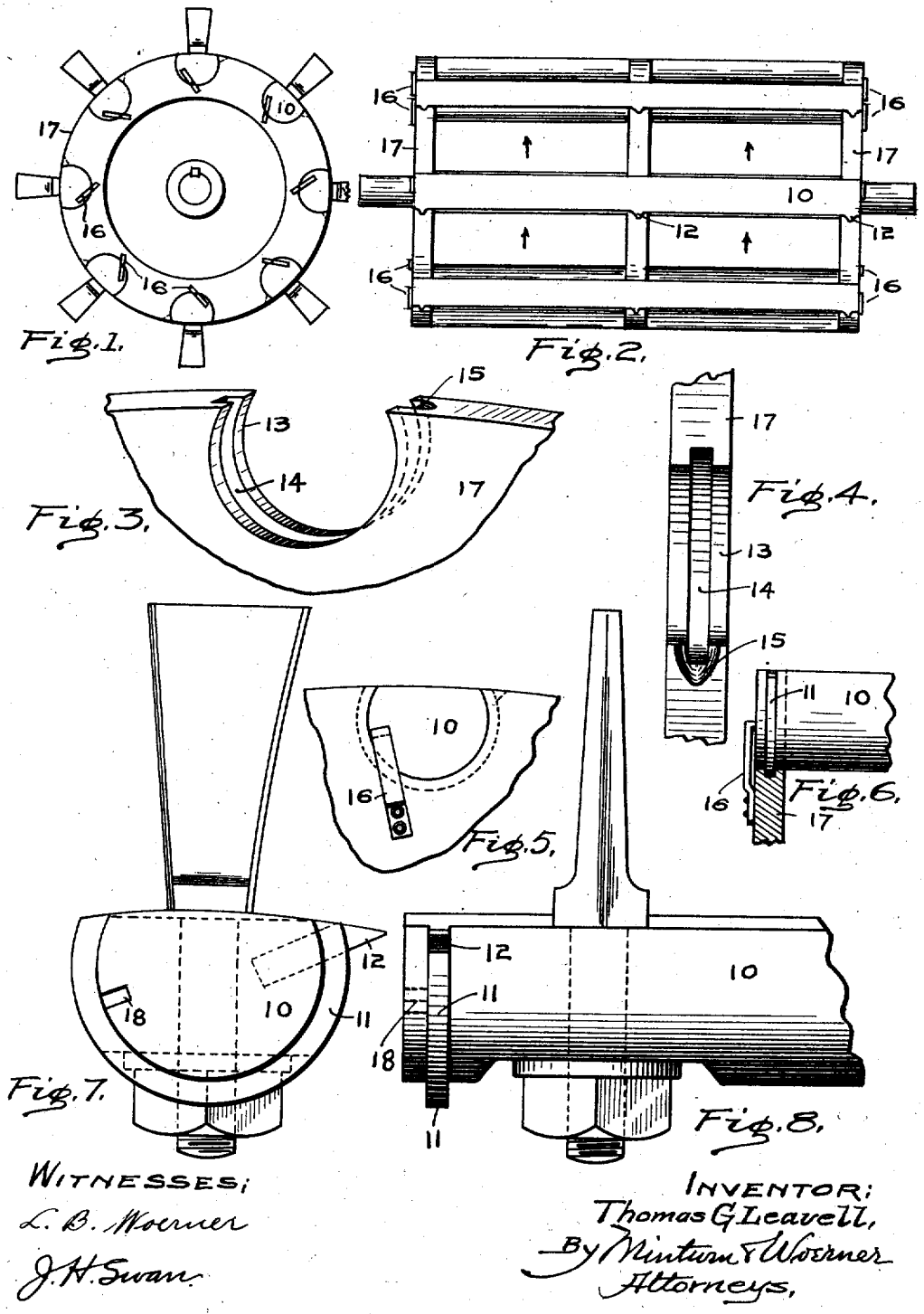
WITNESSES;
L. B. Woerner
J. H. Swan.
INVENTOR;
Thomas G. Leavell,
By Minturn & Woerner
Attorneys.
COLUMBIA PLANOGRAPH CO., WASHINGTON, D. C.

UNITED STATES PATENT OFFICE.

THOMAS G. LEAVELL, OF SPOKANE, WASHINGTON, ASSIGNOR, BY MESNE ASSIGNMENTS, TO SECTIONAL THRESHING CYLINDER COMPANY, OF SPOKANE, WASHINGTON, A CORPORATION OF WASHINGTON.

THRESHING-CYLINDER.

13,599. Specification of Reissued Letters Patent. Reissued July 22, 1913.

Original No. 925,538, dated June 15, 1909, Serial No. 420,350. Application for reissue filed September 30, 1912. Serial No. 723,260.

*To all whom it may concern:*

Be it known that I, THOMAS G. LEAVELL, a citizen of the United States, residing at Spokane, in the county of Spokane and State of Washington, have invented certain new and useful Improvements in Threshing-Cylinders, of which the following is a specification.

This invention pertains to toothed-cylinders, of the kind adapted to rotate upon a shaft and thresh wheat, oats and the like from straw.

The particular object of the invention is to provide a tooth-bar that may be easily removed from the cylinder, for the purpose of setting and re-setting the teeth, and for other purposes. I accomplish the objects of the invention by providing the tooth-bars with tongues and lugs adapted to be retained by grooves and bearings in the cylinder. Pawls secured to the cylinder heads and operating against the tooth-bars assist in retaining the tooth-bars in position during any reverse rotation of the cylinder.

In the drawings, Figure 1, is an end elevation of a cylinder, Fig. 2, is a side elevation of the same with the teeth removed, Fig. 3, is a perspective view of the bearing in the cylinder adapted to receive the tongue and lug of the tooth-bar, Fig. 4, is a front elevation of the same, Fig. 5, is an end elevation of the bearing in the cylinder, adapted to receive the end of the tooth-bar and showing the pawl, Fig. 6, is an elevation of the end of the tooth-bar with a sectional view of the bearing in the cylinder, Fig. 7, is an end elevation of one of the tooth-bars carrying one of the teeth and Fig. 8, is a side elevation of the same.

The tooth-bar 10 is provided with tongues 11 and lugs 12 and the bearings 13 are provided with grooves 14 to receive the tongues 11, and with shoulders 15 against which the lugs 12 press. The bearings 13 are segmental recesses which are greater than a semicircle. Segmental members are formed on the ends of the tooth-bars 10, to fit the segmental recesses. This mechanism would be sufficient to retain the tooth-bars 10 during the rotation of the cylinder in the direction of the arrow, but would not be sufficient in case of any rotation of the cylinder in the opposite direction; therefore I have provided pawls 16 and riveted the same to the cylinder heads 17 in such a manner that they will engage the notches 18 in the tooth-bars 10 on the opposite side from the lugs 12, which, together with the lugs 12, serve as a substantial retaining means of the tooth-bars 10 within their bearings 13 for all purposes including the rotation of the cylinder in either direction.

When it is desired to move the tooth-bar 10, it is only necessary to disengage the pawl 16 from the notch 18 by the use of a finger of the hand or otherwise, and the bar may be drawn from its bearings and as easily replaced and the pawl again thrown into its notch 18 and the bar is again secured.

Having thus described my invention, what I claim as new and useful and desire to secure by Letters Patent, is:

1. A cylinder comprising a plurality of heads having recesses formed in the periphery of the heads, a tooth-bar having integral members proportioned to fit each of said recesses, and means comprising a tongue and groove transverse to the tooth-bars, in the recesses to secure the tooth-bars to the heads.

2. A cylinder comprising a plurality of heads having segmental recesses formed in the periphery of the heads greater than a semicircle, a segmental member proportioned to fit each of said recesses, and means to retain the segmental members in the recesses of the heads.

3. A cylinder comprising a plurality of heads having segmental recesses formed in the periphery of the heads greater than a semicircle, said recesses being each provided with a groove, a segmental member proportioned to fit each of said recesses and provided with a tongue proportioned to fit the groove, and means to retain the segmental members in the recesses of the heads.

4. A cylinder comprising a plurality of heads having segmental recesses formed in the periphery of the heads greater than a semicircle, said recesses being each provided with a groove, a segmental member proportioned to fit each of said recesses and provided with a tongue proportioned to fit the groove, and a stop means of the segmental member contacting with a part of the head to retain the segmental member.

5. A threshing cylinder consisting of tooth-bars coöperating with cylinder heads having recesses formed in their peripheries the recesses being adapted to receive correspondingly formed members of the tooth-bars, means comprising a tongue and groove transverse to the tooth-bars in the recesses to secure the tooth-bars to the heads, and means to prevent accidental removal of the bars.

6. A threshing cylinder consisting of tooth-bars provided with tongues and lugs near the ends thereof coöperating with cylinder heads having recesses formed in their peripheries, the recesses having transverse grooves and stops and adapted to receive the ends of the tooth-bars by a rocking movement of the bar, and means comprising tongues to enter the grooves to retain the ends of the tooth-bars in the recesses of the heads.

7. A threshing cylinder consisting of tooth-bars provided with locking members coöperating with cylinder heads having recesses formed in their peripheries, the recesses being adapted to receive the locking members of the tooth-bars by a rocking movement of the bars, and means comprising a tongue transverse to the tooth bars on one of said parts and adapted to engage a corresponding groove in the other to prevent the relative movement of bars and cylinder heads.

8. A threshing cylinder consisting of tooth-bars and cylinder heads, the heads being provided with recesses to receive the ends of the tooth-bars some of said members being provided with tongues transverse to the tooth bars and lugs, and their mating members being formed to coöperate therewith and to be assembled by a rocking movement of the bar, and means to retain the ends of the tooth-bars in the recesses of the heads.

9. A threshing cylinder consisting of tooth-bars provided with tongues and lugs near the ends thereof coöperating with cylinder heads having recesses formed in their peripheries, the recesses adapted to receive the ends of the tooth-bars, and pawls riveted to the cylinder heads and adapted to engage the ends of the tooth-bars, substantially as described.

In witness whereof, I have hereunto set my hand and seal at Spokane, Washington, this 24th day of September, 1912.

THOMAS G. LEAVELL. [L. S.]

Witnesses:
W. F. Bigelow,
Myrtle R. Whitcher.

Copies of this patent may be obtained for five cents each, by addressing the "Commissioner of Patents, Washington, D. C."